April 26, 1966   E. W. KAUFMAN   3,247,558
MOTION PICTURE FILM CLIP FOR REELS
Filed May 19, 1964

INVENTOR.
EMERON W. KAUFMAN
BY Eugene M. Eckelman
ATTORNEY

United States Patent Office 3,247,558
Patented Apr. 26, 1966

3,247,558
MOTION PICTURE FILM CLIP FOR REELS
Emeron W. Kaufman, P.O. Box 184,
North Portland, Oreg.
Filed May 19, 1964, Ser. No. 368,613
1 Claim. (Cl. 24—81)

This invention relates to a film clip and more particularly is concerned with a clip for holding motion picture film on a reel in unraveling relation.

A primary objective of the present invention is to provide new and useful improvements in the types of clips described, and more particularly to provide such a clip having a novel one-piece construction for simplification of manufacture.

Another object of the invention is to provide a clip of the type described which has friction engagement with a reel and when in engaged position receives the end of a film wound on the reel, and including a novel film engaging portion facilitating easy securement of the film end thereto as well as removal of said film end therefrom.

Still another object is to provide a clip of the type described which is extremely simple in structure and which at the same time is reliable in maintaining a removable grip on the reel and on the film.

The invention will be better understood and additional objects will become apparent from the following specification and claims, considered together with the accompanying drawings, wherein the numerals of reference indicate like parts and wherein:

Figure 1:
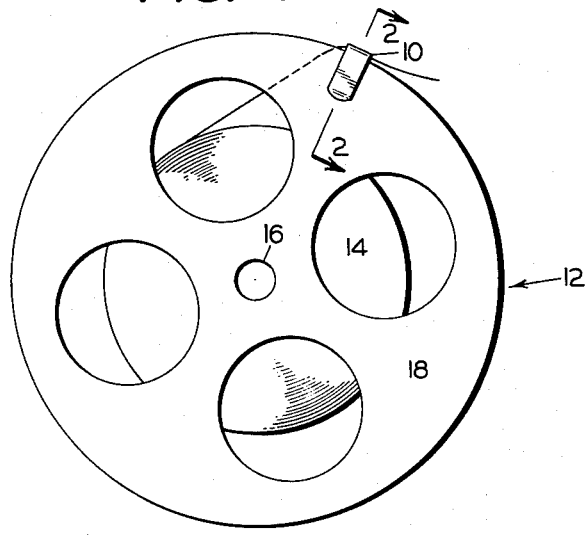
FIGURE 1 is a side elevational view of a film reel having a film wound thereon and having a clip of the present invention mounted on the reel to hold the film secure on the latter.
Figure 2:
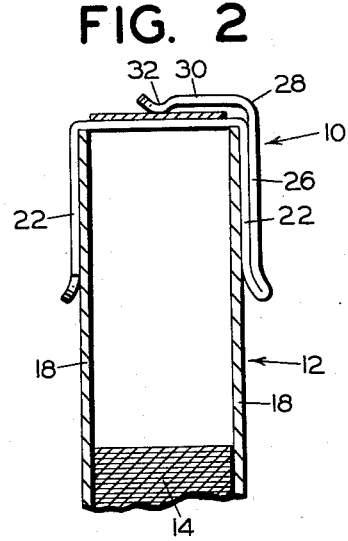
FIGURE 2 is an enlarged fragmentary sectional view taken on the line 2—2 of FIGURE 1.
Figure 3:
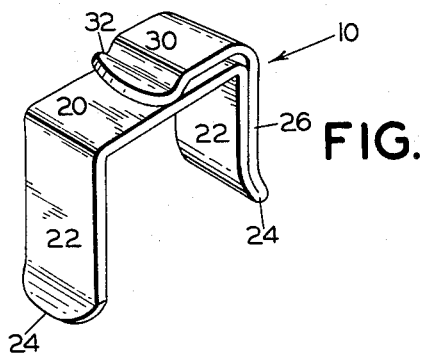
FIGURE 3 is a perspective view of a first form of clip of the present invention.

Referring now to the drawings and first to FIGURES 1-3, a first form of clip is designated by the numeral 10 and is adapted for use on a reel 12. The reel 12 is of the usual type employed for the winding and unwinding of motion picture film 14 comprising a spool type member having a central arbor 16 on which the film is wound and side flanges 18 for confining wound film on the arbor.

The FIGURE 3 embodiment comprises a body portion 20 having opposed gripping legs 22 thereon. Legs 22 extend angularly from the body portion 20 and have outwardly flared portions 24 at the free ends thereof which assist in moving the clip into engagement with the reel 12. The present clip is constructed of a resilient strip material such as spring steel or a resilient plastic in order that the legs 22 may frictionally clamp the opposite sides of a film reel. The legs 22 preferably are angled inwardly toward each other a slight amount at their free ends in order that they must be spread apart for mounting on a reel and thus frictionally grip the said reel.

One of the clamping legs 22 is folded back tightly upon itself in a double leg portion 26, and this double leg portion has a right angle bend 28 at its upper end in the direction of the body portion 20 whereby the free end thereof lies over the top of body portion 20 to form a film engaging clamp finger 30. The finger 30 is arranged such that it bears on the top surface of body portion 20, and since the clip is constructed of a resilient strip material the finger 30 is adapted to frictionally clamp a film strip between itself and the body portion 20. Said finger has a finger tab 32 thereon which comprises a transversely disposed, downwardly recessed portion projecting below the general bottom surface of said strip. This recessed portion provides a ridge engagement of the film to hold the latter in an effective frictional grip.

As an important part of the embodiment of FIGURES 1-3, the clamp finger 30 does not extend the full width of the body portion but instead extends through only a little more than half of said width. The purpose of such selected length of finger tab is that it is exceptionally convenient for film to be inserted under the tab by a lateral or sidewise movement of the film.

After the film has been wound on the reel and it is desired to anchor the free end of the film so that the roll does not unravel or otherwise loosen, one of the clips 10 is clamped on the reel by forcing it over the edge of the latter with the legs 22 on opposite sides thereof. As stated hereinbefore, the spacing of the legs 22 is such that when inserted on the reel a frictional grip is obtained which is adapted to anchor the clip sufficiently to hold the film end secure and prevent unraveling of the film on the reel. The outwardly flared portion 24 of the double leg 22 facilitates mounting the clip on the reel as well as to reinforce the bias of the clamp finger 30. After the clip has been installed on the reel, the operator, in order to engage the film end in anchoring engagement with the clip, merely moves said film edgewise beyond the end of the finger tab 30 and then returns the film while guiding it under the tab.

This edgewise movement of the film to anchor it on the clip eliminates any tedious threading through slots or apertures and greatly speeds up the anchoring of the film end. Furthermore, the shortened construction of the finger 30 requires a minimum edgewise movement of the film end in order to slide it under the strip.

Figure 4:
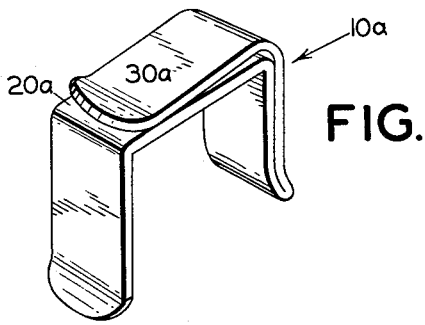
FIGURE 4 is a perspective view of a second form of said clip.

FIGURE 4 illustrates a modified form of the invention, comprising a clip 10a which is of substantially the same construction as FIGURE 3 with the exception that it employs a clamp finger 30a extending substantially the full width of the body 20a instead of approximately half the width of the body as in FIGURE 1. This embodiment is similarly mounted on a reel 12 as in FIGURE 1 and is adapted to frictionally grip a film end between the clamp finger 30a and the body 20a. The only difference resides in the length of the clamp finger, wherein the embodiment of FIGURE 4 requires that the film end be moved transversely a greater amount to move it under the clamp finger.

It is to be understood that the forms of my invention herein shown and described are to be taken as preferred examples of the same and that various other changes in the shape, size and arrangement of parts may be resorted to without departing from the spirit of my invention or the scope of the subjoined claim.

Having thus described my invention, I claim:

A clip for film reels comprising a substantially U-shaped member of resilient material having a body portion and a pair of legs adapted to frictionally grip the sides of a film reel for anchoring said clip thereon, one of said legs having an end portion folded back tightly upon itself and extended upwardly along itself and angularly over a portion of the upper surface of said body portion to form a clamp finger having a free end projecting across and resiliently spring biased to bear against said upper surface, said clamp finger being arranged to receive a strip of film thereunder by sidewise movement of the film under said free end for frictionally clamping said film in place, said one leg being outwardly flared to facilitate mounting of the clip on the reel and to reinforce the bias on the clamp finger.

References Cited by the Examiner

UNITED STATES PATENTS

| | | | |
|---|---|---|---|
| 229,403 | 6/1880 | Haff | 206—53 |
| 648,237 | 4/1900 | Cadaret | 206—55 |
| 1,933,659 | 11/1933 | Curran. | |

FOREIGN PATENTS

| | | |
|---|---|---|
| 873,777 | 4/1942 | France. |
| 1,092,715 | 11/1954 | France. |
| 1,193,961 | 5/1959 | France. |

WILLIAM FELDMAN, *Primary Examiner*.